(12) United States Patent
Yamamoto et al.

(10) Patent No.: US 8,293,816 B2
(45) Date of Patent: Oct. 23, 2012

(54) MIXED ALUMINUM HYDROXIDE POWDER

(75) Inventors: Kazuyuki Yamamoto, Shizuoka (JP); Takahiro Kuroda, Shizuoka (JP); Toshihiro Matsuba, Tokyo (JP)

(73) Assignee: Nippon Light Metal Company, Ltd., Tokyo (JP)

( * ) Notice: Subject to any disclaimer, the term of this patent is extended or adjusted under 35 U.S.C. 154(b) by 178 days.

(21) Appl. No.: 12/866,038

(22) PCT Filed: Feb. 2, 2009

(86) PCT No.: PCT/JP2009/051720
§ 371 (c)(1), (2), (4) Date: Aug. 4, 2010

(87) PCT Pub. No.: WO2009/099034
PCT Pub. Date: Aug. 13, 2009

(65) Prior Publication Data
US 2010/0331471 A1     Dec. 30, 2010

(30) Foreign Application Priority Data
Feb. 5, 2008  (JP) ................. 2008-025554

(51) Int. Cl.
*C08K 7/00* (2006.01)
(52) U.S. Cl. .................. 523/220; 423/629; 524/437
(58) Field of Classification Search .................. 523/220; 524/437; 423/629
See application file for complete search history.

(56) References Cited

U.S. PATENT DOCUMENTS

| 6,382,538 | B1 | 5/2002 | Nippa et al. |
| 2003/0207980 | A1 | 11/2003 | Onishi et al. |
| 2006/0140851 | A1 | 6/2006 | Onishi |
| 2007/0246693 | A1* | 10/2007 | Herbiet et al. ............... 252/609 |

FOREIGN PATENT DOCUMENTS

| JP | 5-58623 | A | 3/1993 |
| JP | 5-170971 | A | 7/1993 |
| JP | 9-208740 | A | 8/1997 |
| JP | 2000-239013 | A | 9/2000 |
| JP | 2001-322813 | A | 11/2001 |
| JP | 2002-114867 | A | 4/2002 |
| JP | 2004-182555 | A | 7/2004 |
| JP | 2004-182556 | A | 7/2004 |

OTHER PUBLICATIONS

"International Search Report, dated, Mar. 24, 2009, issued in PCT/JP2009/051720".
International Preliminary Report on Patentability mailed on Sep. 16, 2010, in connection with PCT International Application No. PCT/JP2009/051720.

* cited by examiner

*Primary Examiner* — Edward Cain
(74) *Attorney, Agent, or Firm* — Birch, Stewart, Kolasch & Birch, LLP

(57) ABSTRACT

Provided is a mixed aluminum hydroxide powder suitable as a filler to be filled into a resin or the like, particularly suitable in an application where the filler is desired to be filled in a large amount, and enabling the production of a molded article excellent in strength properties. The mixed aluminum hydroxide powder is obtained by mixing an aluminum hydroxide powder X having an average secondary particle diameter in the range of 5 to 16 μm and a shape coefficient of 4 or less, and an aluminum hydroxide powder Y having an average secondary particle diameter in the range of 0.5 to 2.0 μm and a shape coefficient of 4 or less, the mixed aluminum hydroxide powder being adjusted so as to have an average secondary particle diameter in the range of 0.9 to 12 μm.

5 Claims, 2 Drawing Sheets

MIXED ALUMINUM HYDROXIDE POWDER

TECHNICAL FIELD

The present invention relates to a mixed aluminum hydroxide powder obtained by mixing aluminum hydroxide powders different from each other in average secondary particle diameter, in particular, a mixed aluminum hydroxide powder that enables the production of a molded article excellent in strength properties when used as a filler to be filled into a resin or the like.

BACKGROUND ART

Aluminum hydroxide has been conventionally used as a filler to be filled into a resin such as rubber or plastics in a wide variety of applications. One of the major applications out of them is the use of aluminum hydroxide as a flame retardant filler. In addition, aluminum hydroxide has been recently used also as a filler for a thermally conductive sheet for discharging heat from, for example, such a large-scale glass substrate as to enable the formation of a flat panel display such as a plasma display panel (PDP).

When aluminum hydroxide is used as a flame retardant or a heat-discharging filler, an increase in amount in which aluminum hydroxide is filled is desired in order that aluminum hydroxide may sufficiently attain its object. However, increasing the amount in which aluminum hydroxide is filled typically causes such a problem as described below. An increase in viscosity occurs, and hence a kneading torque upon production of a molded article increases to deteriorate moldability.

In view of the foregoing, the following technology has been reported (see Patent Document 1). Two or three aluminum hydroxide powders having secondary particle diameters and specific surface areas within specific ranges are blended so that a reduction in viscosity upon filling into a resin may be achieved and an increase in amount in which aluminum hydroxide is filled may be enabled. That is, the technology aims at a reducing effect on the viscosity based on the embedment of middle particles (10 to 15 μm) or fine particles (0.5 to 10 μm) in gaps between coarse particles (35 to 150 μm) or the middle particles by mixing aluminum hydroxide powders containing the coarse particles, the middle particles, and the fine particles to form a powder having a wide particle size distribution.

Although the above-mentioned technology can suppress an increase in viscosity to enable an increase in amount in which aluminum hydroxide is filled, it cannot be said that sufficient investigations have been conducted on the strength properties of the resultant molded article. That is, the aluminum hydroxide powder requires the blending of at least the powders containing the coarse particles (35 to 150 μm) and the fine particles (0.5 to 10 μm), and forms a wide particle size distribution, but the presence of, in particular, such coarse particles as described above may cause the following trouble. When a molded article is obtained by filling the powder into a resin, a site where a stress is apt to converge is formed, and the strength (bending strength) of the molded article reduces. Accordingly, the powder is not suitable for use as, for example, a flame retardant in an electric-related sealing material or the like because flame retardant properties are obtained but the strength becomes insufficient.

Patent Document 1: JP 2002-114867 A

DISCLOSURE OF THE INVENTION

Problems to be Solved by the Invention

In view of the foregoing, the inventors of the present invention have made extensive studies on an aluminum hydroxide powder which, when used as a filler to be filled into a resin or the like, can secure the amount in which the filler is filled and enables the production of a molded article excellent in strength properties. As a result, the inventors have found that the above-mentioned problems can be solved by mixing aluminum hydroxide powders belonging to the fine particles in the above-mentioned prior art, the powders being different from each other in average secondary particle diameter and each having a specified shape coefficient, to form a mixed powder. Thus, the inventors have completed the present invention.

Therefore, an object of the present invention is to provide a mixed aluminum hydroxide powder suitable as a filler to be filled into a resin or the like, particularly suitable in an application where the filler is desired to be filled in a large amount, and enabling the production of a molded article excellent in strength properties.

Another object of the present invention is to provide a molded article excellent in strength properties obtained by using the above-mentioned mixed aluminum hydroxide powder.

Means for Solving the Problems

That is, the present invention is a mixed aluminum hydroxide powder obtained by mixing an aluminum hydroxide powder X having an average secondary particle diameter (Dp) in the range of 5 to 16 μm and a shape coefficient ($\phi$) of 4 or less, and an aluminum hydroxide powder Y having an average secondary particle diameter (Dp) in the range of 0.5 to 2.0 μm and a shape coefficient ($\phi$) of 4 or less, the mixed aluminum hydroxide powder having an average secondary particle diameter (Dp) in the range of 0.9 to 12 μm.

In addition, the present invention is a molded article obtained by filling the above-mentioned mixed aluminum hydroxide powder into a resin.

First, an aluminum hydroxide powder having an average secondary particle diameter (Dp) in the range of 5 to 16 μm, or preferably 6 to 13 μm and a shape coefficient ($\phi$) of 4 or less, or preferably 3 or less is used as the aluminum hydroxide powder X in the present invention. When the average secondary particle diameter (Dp) is smaller than 5 μm, an effect of mixing the powder with the aluminum hydroxide powder Y reduces. In contrast, when the average secondary particle diameter exceeds 16 μm, upon production of a molded article, a reduction in strength of the molded article occurs owing to, for example, the convergence of a stress. In addition, when the shape coefficient ($\phi$) exceeds 4, the number of sharp portions on the particle surfaces increases, and the portions cause the breakdown of the molded article. Here, the average secondary particle diameter (Dp) is a diameter median on a weight basis, and is a value determined from particle size analysis based on a laser diffraction method. In addition, the shape coefficient ($\phi$) is a value calculated from the following equation (1), and means the following. As the value becomes smaller, each particle becomes closer to a true sphere. Accordingly, a lower limit for the shape coefficient of each of the aluminum hydroxide powders X and Y is a theoretical value, i.e., 1.

$$\phi = Dp/Db \qquad (1)$$

In the above-mentioned equation, Dp represents the above-mentioned average secondary particle diameter and Db is determined from the following equation (2) by using the BET specific surface area (BET: unit $m^2/g$) of the aluminum hydroxide powder X. It should be noted that the BET specific surface area is a value determined by an $N_2$ gas adsorption method and 2.42 is the true specific gravity of aluminum hydroxide.

$$Db = 6/BET \times 2.42 \quad (2)$$

In addition, an aluminum hydroxide powder having an average secondary particle diameter (Dp) in the range of 0.5 to 2.0 μm, or preferably 0.7 to 1.7 μm and a shape coefficient (φ) of 4 or less, or preferably 3 or less is used as the aluminum hydroxide powder Y. When the average secondary particle diameter (Dp) is smaller than 0.5 μm, upon filling into a resin or the like, a viscosity increases or dispersibility deteriorates. In contrast, when the average secondary particle diameter exceeds 2.0 μm, the effect of mixing the powder with the aluminum hydroxide powder X reduces. In addition, when the shape coefficient (φ) exceeds 4, the number of sharp portions on the particle surfaces increases, and the portions cause the breakdown of the molded article. It should be noted that the average secondary particle diameter (Dp) and the shape coefficient (φ) represent the same ones as those in the case of the aluminum hydroxide powder X.

Means for obtaining each of the above-mentioned aluminum hydroxide powders X and Y is not particularly limited. However, each powder has a small average secondary particle diameter, and particles each having a small shape coefficient and a nearly spherical shape must be obtained. Accordingly, those powders are each desirably obtained by precipitation from a sodium aluminate solution obtained by a Bayer process, and conditions upon precipitation are preferably specified. That is, the powders X and Y can each be obtained by employing such a precipitation method as described below, though aluminum hydroxide can be industrially produced by the so-called Bayer process involving adding seeds of aluminum hydroxide to a sodium aluminate solution prepared by treating bauxite with a caustic soda solution to hydrolyze sodium aluminate so that aluminum hydroxide may be precipitated.

First, for example, a method described in Japanese Patent Application Laid-open No. Hei 5-58623 can be employed as means for obtaining the aluminum hydroxide powder X. That is, while the temperature of a sodium aluminate solution having a degree of supersaturation of 1.1 to 1.8 (70 to 180 g/l in terms of an $Na_2O$ concentration) obtained by the Bayer process is kept at 40 to 85° C., 5 g/l or more, or preferably 5 to 50 g/l of ground gibbsite seeds each having an MF value represented by the following equation (3) of 10 or more and having an average particle diameter of 3 to 10 μm are added. Then, the mixture is gradually cooled while being agitated for 48 to 96 hours so that aluminum hydroxide may be precipitated. In this case, aluminum hydroxide having a predetermined average secondary particle diameter and a predetermined shape coefficient can be precipitated by maintaining the degree of supersaturation of the sodium aluminate solution at the time of the completion of the precipitation within the above-mentioned range. Aluminum hydroxide thus precipitated is separated by filtration and dried according to an ordinary method. Thus, the aluminum hydroxide powder X can be obtained. It should be noted that the MF value represented by the equation (3) is a ratio of the diffraction intensity of a (002) face to the total diffraction intensity of a (110) face and a (200) face upon X-ray diffraction measurement of gibbsite type aluminum hydroxide. The hexagonal plate face of a gibbsite crystal corresponds to the (002) face, prism faces perpendicular to the hexagonal plate face correspond to the (200) face and the (110) face, and an X-ray diffraction intensity to be measured is proportional to the area ratio of each face present in the measurement sample. In addition, the degree of supersaturation is represented as a ratio of C to Cs where C represents the concentration of alumina actually dissolved in the sodium aluminate solution and Cs represents the saturation concentration of alumina under the same conditions as those in the case of the above-mentioned concentration.

$$MF \text{ value} = \frac{I(002)}{I\{(110) + (200)\}} \quad (3)$$

(In the equation, I represents an X-ray diffraction intensity at each crystal face.)

The sphericity of the powder obtained as described above has already become high. However, the powder may have sharp portions peculiar to gibbsite. Accordingly, the aluminum hydroxide powder X may be obtained by further performing a treatment for abrading the sharp portions as required. That is, the powder may be subjected to a spheroidizing treatment by any one of, for example, (a) a method for spheroidization involving dispersing an aluminum hydroxide cake obtained by separation by filtration once in a sodium aluminate solution whose concentration is equal to or less than a saturation solubility and partially dissolving sharp portions on the crystal surface, (b) a method involving passing precipitated slurry as it is through a relatively weak shear field such as a centrifugal pump, a centrifugal separator, or a colloid mill to abrade the sharp portions of the crystal, and (c) a method based on a combination of these methods (a) and (b).

On the other hand, the aluminum hydroxide powder Y is finer than the powder X. Accordingly, a method described in Japanese Patent Application Laid-open No. Hei 10-130017 is suitably employed. That is, the method is as described below. Upon production of aluminum hydroxide by the addition of aluminum hydroxide having an average secondary particle diameter of 0.5 to 4 μm, or preferably 0.6 to 2 μm as seeds in an amount in the range of preferably less than 100 $m^2/l$, or more preferably less than 90 $m^2/l$ to an aqueous solution of sodium aluminate having an $Na_2O$ concentration of 50 to 200 g/l, or preferably 90 to 160 g/l and an $Al_2O_3$ concentration of 50 to 220 g/l, or preferably 90 to 180 g/l, the heating of the mixture to a temperature of typically 40 to 90° C., or preferably 50 to 80° C. under agitating, and the hydrolysis of sodium aluminate under heating, the resultant slurry is subjected to solid-liquid separation with, for example, a pressure type filter or a centrifugal separator, and then the resultant is washed by appropriately repeating an operation involving the formation of slurry from the resultant with washing water for solid-liquid separation and dried after the washing. Here, a method of producing aluminum hydroxide to be used as seeds is not particularly limited as long as the method enables the production of aluminum hydroxide having an average secondary particle diameter of 0.5 to 4 μm. The method may be a pulverization method, or may be a precipitation method. Aluminum hydroxide Y having a predetermined average secondary particle diameter and a predetermined shape coefficient can be obtained by adopting such precipitation method. In addition, as in the case of the aluminum hydroxide powder X, the powder obtained in the foregoing may be spheroidized by being further subjected to an abrasion treatment. The abrasion treatment in this case is, for example, a pulverization treatment involving the use of a wet grinder as well as the above-mentioned methods (a) to (c).

In addition, in the present invention, a mixed aluminum hydroxide powder having an average secondary particle diameter in the range of 0.9 to 12 μm, or preferably 1.5 to 10 μm is obtained by mixing the above-mentioned powders X and Y. When the average secondary particle diameter of the mixed powder exceeds 12 μm, in the case where a molded article is formed by filling the mixed powder into a resin or the like, strength properties, or in particular a bending strength and a strain may reduce. In contrast, when the average secondary particle diameter is smaller than 0.9 μm, the dispersibility of the mixed powder in the resin or the like deteriorates, and hence it becomes difficult to increase the amount in which the mixed powder is filled. In the present invention, the mixed powder having an average secondary particle diameter within the above-mentioned range is obtained by blending the two components, i.e., the powders X and Y. Accordingly, an increase in viscosity upon filling into the resin or the like is suppressed, and hence the amount in which the mixed powder is filled can be secured. In addition, an excessive increase in bending elastic modulus and a reduction in bending strength can be suppressed.

Here, as in the case of each of the powders X and Y, the average secondary particle diameter (Dp) of the mixed powder is a diameter median on a weight basis, and is a value determined from particle size analysis based on the laser diffraction method. In addition, the powders X and Y have only to be mixed so that the average secondary particle diameter of the mixed powder may fall within the above-mentioned predetermined range while the amount in which each of the powders is blended is adjusted on the basis of the particle size analysis based on the laser diffraction method. In this case, a molded article additionally excellent in strength properties can be obtained by blending the powders X and Y at a weight ratio "X/Y" of preferably 9/1 to 1/9, or more preferably 8/2 to 4/6. Means for mixing the powders X and Y is not particularly limited, and a known method such as an air blender, a V type blender, a rocking blender, a Henschel mixer, or a Nauta mixer can be employed. It should be noted that, in the most preferred embodiment, the mixed powder of the present invention is formed only of the powders X and Y, and the weight ratio "X/Y" falls within the above-mentioned range.

In addition, the content of particles each having a particle diameter of 37 μm or more in the resultant mixed aluminum hydroxide powder is set to preferably 20 wt % or less, or more preferably 5 wt % or less. A content of the particles each having a particle diameter of 37 μm or more in excess of 20 wt % is not desirable because the strength properties (especially bending strength) of the molded article obtained by filling the mixed powder into the resin or the like may reduce. It should be noted that the content of the particles each having a particle diameter of 37 μm or more can be determined on the basis of a particle size distribution based on the laser diffraction method.

In the present invention, the surface of the aluminum hydroxide powder X or the aluminum hydroxide powder Y described above, or the surfaces of both the powders may be treated by a known method involving the use of, for example, a silane coupling agent, a titanate coupling agent, or an aliphatic acid such as stearic acid. When, for example, a treatment involving the use of the silane coupling agent out of those treatments is performed, compatibility with the resin or the like is improved and the ratio at which the mixed powder is filled can be additionally secured. In addition, the strength of the resultant molded article can be additionally improved. Examples of such silane coupling agent include vinylsilane, epoxysilane, methacryloxysilane, and mercaptosilane. In addition, the amount of the treatment agent upon performance of the surface treatment has only to be appropriately set without deviating from an object of the present invention. In the case of, for example, methacryloxysilane, the amount is preferably 0.1 to 2.0 wt % with respect to the powder (X or Y), though a preferred amount varies depending on the kind of a surface treatment agent to be used. Even when at least one of the powders is subjected to a surface treatment, the average secondary particle diameter of the mixed powder obtained by mixing the powders after the surface treatment must be set to fall within the above-mentioned range. That is, a surface treatment is independently performed for each powder (X or Y), and then the powders X and Y are mixed so that the mixed powder may be obtained. A known method can be adopted as specific means for a surface treatment for each powder. For example, a method involving uniformly dispersing a surface treatment agent in a powder to be subjected to a surface treatment while stirring the powder with a mixer or the like to treat the powder can be exemplified.

The mixed aluminum hydroxide powder of the present invention can be used as a filler to be filled into a resin or the like, and the resin or the like into which the mixed powder is to be filled is not particularly limited. Examples of the resin or the like include: an acrylic resin, a vinyl ester resin, and an unsaturated polyester resin each typically used when the mixed powder is used as a filler for an artificial marble; and an epoxy resin and a phenol resin each used when the mixed powder is used as a flame retardant filler upon molding of any one of, for example, various sealing materials and printed wiring boards. Further, when the mixed powder is used as a heat-discharging filler upon formation of, for example, a thermally conductive sheet for discharging heat from, for example, a glass substrate of which a flat panel display such as a PDP is formed or a heat-discharging sheet for an electronic part, any one of, for example, a silicone resin, grease, rubber, and various thermoplastic elastomers as well as the above-mentioned resins can also be used. It should be noted that the resin or the like may be formed of one kind of them, or may be a mixture of two or more kinds of them.

In addition, upon production of a molded article by the filling of the mixed aluminum hydroxide powder in the present invention into a resin, a curing agent, a defoaming agent, a releasing agent, or the like may be added depending on, for example, the kind of the resin and a purpose of a molded article to be obtained. In addition, a predetermined molded article has only to be obtained by subjecting a resin composition containing the mixed aluminum hydroxide powder to heat curing or photo-curing as required and employing a known method.

Effects of the Invention

The mixed aluminum hydroxide powder of the present invention is obtained by mixing aluminum hydroxide powders having different average secondary particle diameters. In addition, when the mixed powder is used as a filler to be filled into a resin or the like, the amount in which the filler is filled can be secured. In particular, those aluminum hydroxide powders each have a small average secondary particle diameter and a high sphericity. Accordingly, a molded article excellent in strength properties can be obtained.

BEST MODE FOR CARRYING OUT THE INVENTION

Figure 1:
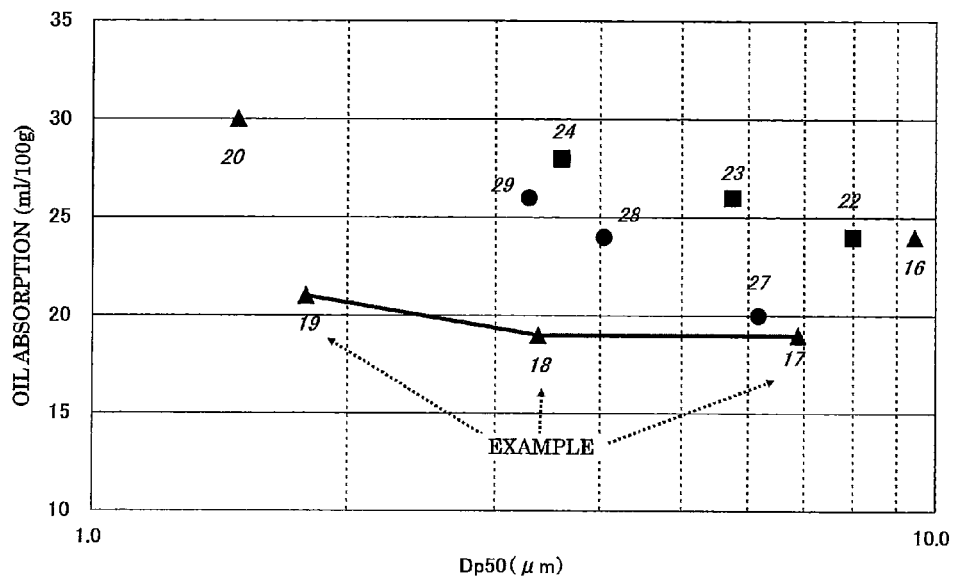
FIG. 1 is a graph showing a relationship between the oil absorption of a mixed powder and the average secondary particle diameter of the mixed powder.

Hereinafter, a preferred embodiment of the present invention is described on the basis of examples and comparative examples. It should be noted that a laser diffraction type particle size analyzer (Microtrac 9320HRA (X100) manufactured by NIKKISO CO., LTD.) was used for measuring an average secondary particle diameter (Dp). The content of particles each having a particle diameter of 37 μm or more was determined by summing the contents of the particles each having a particle diameter of 37 μm or more from the results of the above-mentioned particle size measurement. In addition, a shape coefficient φ was determined by using the following equations (1) and (2). In this case, a BET specific surface area was measured with an automatic specific surface area-measuring apparatus FlowSorb II2300 manufactured by Micromeritics by an $N_2$ gas adsorption method.

$$\phi = Dp/Db \quad (1)$$

[In the equation, Dp represents the average secondary particle diameter and Db is a value calculated from the following equation (2) by using the BET specific surface area (BET: unit $m^2/g$) of an aluminum hydroxide powder.

$$Db = 6/BET \times 2.42 \quad (2)]$$

EXAMPLES

Production of Aluminum Hydroxide Powder

Aluminum hydroxide powders A to J shown in Table 1 were each prepared as described below.

(Powder A)

While the temperature of an aqueous solution of sodium aluminate ($Na_2O$ concentration: 153 g/l) having a degree of supersaturation (C/Cs ratio) of 1.45 obtained by the Bayer process was kept at 80° C., ground gibbsite seeds each having an MF value represented by the following equation (3) of 11 were added in an amount of 15 g/l to the solution. The mixture was gradually cooled while being agitated for 72 hours. Thus, aluminum hydroxide was precipitated. In this case, the degree of supersaturation of the sodium aluminate solution was maintained at 1.1 to 1.8 by the time of the completion of the precipitation. Aluminum hydroxide thus precipitated was separated by filtration and dried. Thus, a powder A was obtained. The average secondary particle diameter (Dp), content of particles each having a particle diameter of 37 μm or more (+37 μm), and shape coefficient of the powder A are as shown in Table 1.

$$MF \text{ value} = \frac{I(002)}{I\{(110) + (200)\}} \quad (3)$$

(In the equation, I represents an X-ray diffraction intensity at each crystal face.)

(Powder B)

Aluminum hydroxide was added as seeds in an amount of 50 $m^2/l$ to an aqueous solution of sodium aluminate ($Na_2O$ concentration: 135 g/l, $Al_2O_3$ concentration: 145 g/l) obtained by the Bayer process. Then, the mixture was heated to 60° C. under agitating so that sodium aluminate might be hydrolyzed. The resultant slurry was subjected to solid-liquid separation with a centrifugal separator, and then the resultant was washed by repeating an operation involving the formation of slurry from the resultant with washing water and solid-liquid separation three times in total and dried after the washing. Thus, a powder B having an average secondary particle diameter (Dp), a content of particles each having a particle diameter of 37 μm or more (+37 μm), and a shape coefficient shown in Table 1 was obtained.

(Powders C to E)

Commercially available aluminum hydroxide (manufactured by Nippon Light Metal Company, Ltd., trade name: B53, average secondary particle diameter: 50 μm) was ground with a vibrating ball mill (manufactured by CHUO KAKOHKI CO., LTD.). Thus, a powder E was obtained. In addition, commercially available aluminum hydroxide identical to that used upon production of the powder E was ground with a wet attritor (manufactured by Mitsui Miike Machinery Co., Ltd.) until a target particle diameter was obtained. Then, the resultant was dried. Thus, a powder D was obtained. Further, commercially available aluminum hydroxide (manufactured by Nippon Light Metal Company, Ltd., trade name: BW53, average secondary particle diameter: 50 μm) was ground with the vibrating ball mill (identical to that described above). Thus, a powder C was obtained. Table 1 shows the average secondary particle diameter (Dp), content of particles each having a particle diameter of 37 μm or more (+37 μm), and shape coefficient of each of those powders C to E. It should be noted that aluminum hydroxide used upon production of the powder C is different from that used upon production of the powder E in the following points. The former has a smaller amount of impurities and a higher whiteness than those of the latter.

(Powders F to J)

The powder A obtained in the foregoing was loaded into a mixer and 3-methacryloxypropyltrimethoxysilane was uniformly dispersed at a ratio of 0.4 to 1.0 wt % with respect to the powder A. The mixture was agitated so that a silane coupling treatment might be performed. Thus, a powder F was obtained. In addition, the powders B to E were each subjected to a silane coupling treatment under the same condition as that described above. Thus, powders G, H, I, and J were obtained from the powders B, C, D, and E, respectively. Table 1 shows the average secondary particle diameter (Dp), content of particles each having a particle diameter of 37 μm or more (+37 μm), and shape coefficient of each of those powders F to J.

TABLE 1

| Powder | Dp (μm) | +37 μm (wt %) | Shape coefficient | Silane coupling treatment | Remark |
|---|---|---|---|---|---|
| A | 8.8 | 4.2 | 2.5 | Absent | Corresponding to powder X |
| B | 1.2 | 0.0 | 2.3 | Absent | Corresponding to powder Y |
| C | 9.8 | 0.8 | 9.5 | Absent | |
| D | 1.5 | 0.0 | 8.6 | Absent | |
| E | 11.0 | 18.7 | 9.7 | Absent | |
| F | 9.5 | 5.4 | 2.3 | Present | Corresponding to powder X |
| G | 1.5 | 0.0 | 2.2 | Present | Corresponding to powder Y |
| H | 9.8 | 0.8 | 9.5 | Present | |

TABLE 1-continued

| Powder | Dp (μm) | +37 μm (wt %) | Shape coefficient | Silane coupling treatment | Remark |
|---|---|---|---|---|---|
| I | 2.0 | 0.0 | 10.5 | Present | |
| J | 9.5 | 18.8 | 6.5 | Present | |

[Preparation of Mixed Aluminum Hydroxide Powder]

The aluminum hydroxide powders A to J obtained in the foregoing were combined as shown in Tables 2 and 3, and the respective combined powders were mixed at predetermined weight ratios with a V type blender for 10 minutes. Thus, mixed aluminum hydroxide powders for Test Nos. 1 to 30 were obtained (provided that Test Nos. 1, 5, 6, 10, 11, 15, 16, 20, 21, 25, 26, and 30 were each formed of one kind of a powder). The average secondary particle diameter (Dp), content of particles each having a particle diameter of 37 μm or more, and shape coefficient of each of the resultant mixed powders are as shown in Tables 2 and 3.

In addition, the oil absorption of each of the mixed powders obtained in the foregoing was measured as described below. Each mixed powder was kneaded with di-2-ethylhexyl phthalate (DOP), and the amount of DOP required for the mixture to be in a hardly wrung state was measured in conformity with JIS K5101-1991 and represented in terms of an oil content (ml) with respect to 100 g of the mixed powder. Tables 2 and 3 show the results. FIG. 1 illustrates a graph obtained from a relationship between the oil absorption of a mixed powder formed of two powders each subjected to a silane coupling treatment out of the mixed powders and the average secondary particle diameter of the mixed powder. As is apparent from FIG. 1, mixed powders each obtained by mixing the powders (A, B, F, and G) corresponding to the aluminum hydroxide powders X and Y in the present invention in predetermined amounts each had a lower oil absorption than that of any other mixed powder, and an increase in amount in which each of the mixed powders was filled was attained as compared with that in the case of any other mixed powder. The foregoing probably owes to the following two effects. The first effect is based on a mixed powder obtained by mixing two components. The second effect is based on the specification of the shape coefficient of each component (so that the component may be additionally close to a spherical shape) because an oil absorption reduces as compared with that of any other mixed powder having an average secondary particle diameter equal or close to that of any such mixed powder. It should be noted that the numbers provided for the respective plots in FIG. 1 represent the respective test numbers (Test Nos.).

TABLE 2

| Test No. | Powders to be mixed and weight ratio between them | | Dp (μm) | +37 μm (wt %) | Shape coefficient | Bending strength (MPa) | Elastic modulus (MPa) | Strain (%) | Oil absorption (ml/100 g) | Remark |
|---|---|---|---|---|---|---|---|---|---|---|
| 1 | A/B | 10/0 | 8.8 | 4.2 | 2.5 | 85.1 | 4973 | 2.02 | 30 | Comparative Example |
| 2 | | 8/2 | 5.9 | 2.4 | 3.1 | 82.1 | 5152 | 1.80 | 29 | Example |
| 3 | | 6/4 | 2.5 | 1.8 | 2.0 | 80.7 | 4992 | 1.79 | 33 | Example |
| 4 | | 4/6 | 1.6 | 0.8 | 1.5 | 80.0 | 5004 | 1.75 | 40 | Example |
| 5 | | 0/10 | 1.2 | 0.0 | 2.3 | 68.9 | 5318 | 1.33 | 48 | Comparative Example |
| 6 | C/D | 10/0 | 9.8 | 0.8 | 9.5 | 84.2 | 4904 | 1.95 | 36 | Comparative Example |
| 7 | | 8/2 | 7.5 | 0.4 | 13.7 | 70.1 | 4955 | 1.54 | 32 | Comparative Example |
| 8 | | 6/4 | 4.6 | 0.3 | 12.7 | 65.2 | 4965 | 1.36 | 34 | Comparative Example |
| 9 | | 4/6 | 2.7 | 0.0 | 10.2 | 63.7 | 5237 | 1.24 | 38 | Comparative Example |
| 10 | | 0/10 | 1.5 | 0.0 | 8.6 | 65.3 | 5363 | 1.24 | 54 | Comparative Example |
| 11 | E/D | 10/0 | 11.0 | 18.7 | 9.7 | 73.4 | 5010 | 1.63 | 29 | Comparative Example |
| 12 | | 8/2 | 5.7 | 14.0 | 9.9 | 72.7 | 4852 | 1.62 | 32 | Comparative Example |
| 13 | | 6/4 | 3.0 | 9.0 | 8.2 | 71.5 | 5372 | 1.41 | 36 | Comparative Example |
| 14 | | 4/6 | 2.6 | 8.2 | 8.6 | 67.9 | 5314 | 1.34 | 40 | Comparative Example |
| 15 | | 0/10 | 1.5 | 0.0 | 8.6 | 65.3 | 5363 | 1.24 | 54 | Comparative Example |

TABLE 3

| Test No. | Powders to be mixed and weight ratio between them | | Dp (μm) | +37 μm (wt %) | Shape coefficient | Bending strength (MPa) | Elastic modulus (MPa) | Strain (%) | Oil absorption (ml/100 g) | Remark |
|---|---|---|---|---|---|---|---|---|---|---|
| 16 | F/G | 10/0 | 9.5 | 5.4 | 2.3 | 87.0 | 4871 | 2.05 | 24 | Comparative Example |
| 17 | | 8/2 | 6.9 | 3.1 | 3.3 | 85.7 | 4712 | 2.07 | 19 | Example |
| 18 | | 6/4 | 3.4 | 1.5 | 2.5 | 84.6 | 4927 | 1.88 | 19 | Example |
| 19 | | 4/6 | 1.8 | 0.4 | 1.7 | 83.8 | 5000 | 1.83 | 21 | Example |

TABLE 3-continued

| Test No. | Powders to be mixed and weight ratio between them | | Dp (μm) | +37 μm (wt %) | Shape coefficient | Bending strength (MPa) | Elastic modulus (MPa) | Strain (%) | Oil absorption (ml/100 g) | Remark |
|---|---|---|---|---|---|---|---|---|---|---|
| 20 | | 0/10 | 1.5 | 0.0 | 2.2 | 85.8 | 5328 | 1.75 | 30 | Comparative Example |
| 21 | H/I | 10/0 | 9.8 | 0.8 | 9.5 | 86.3 | 4710 | 2.08 | 25 | Comparative Example |
| 22 | | 8/2 | 8.0 | 0.4 | 12.9 | 84.1 | 4801 | 1.94 | 24 | Comparative Example |
| 23 | | 6/4 | 5.8 | 0.3 | 14.6 | 83.4 | 5254 | 1.74 | 26 | Comparative Example |
| 24 | | 4/6 | 3.6 | 0.3 | 12.5 | 79.1 | 5049 | 1.69 | 28 | Comparative Example |
| 25 | | 0/10 | 2.0 | 0.0 | 10.5 | 75.3 | 5395 | 1.48 | 38 | Comparative Example |
| 26 | J/I | 10/0 | 9.5 | 18.8 | 6.5 | 79.0 | 5103 | 1.76 | 19 | Comparative Example |
| 27 | | 8/2 | 6.2 | 15.6 | 9.7 | 77.6 | 5157 | 1.66 | 20 | Comparative Example |
| 28 | | 6/4 | 4.0 | 13.9 | 10.1 | 74.7 | 5191 | 1.53 | 24 | Comparative Example |
| 29 | | 4/6 | 3.3 | 9.7 | 10.0 | 72.7 | 5239 | 1.45 | 26 | Comparative Example |
| 30 | | 0/10 | 2.0 | 0.0 | 10.5 | 75.3 | 5395 | 1.48 | 38 | Comparative Example |

[Evaluation of Molded Article for Strength]

Next, an acrylic resin syrup was prepared, and the mixed aluminum hydroxide powder for Test No. 1 was added at a ratio of 54 wt % with respect to the above-mentioned resin. In addition, bis(4-t-butylcyclohexyl)peroxydicarbonate as a curing agent was added at a ratio of 1 wt % with respect to the above-mentioned resin, and the mixture was agitated with a universal mixing mixer (5DMV-01-RS manufactured by San-ei Seisakusho) for about 5 minutes and deaerated. Thus, a resin composition according to Test No. 1 was prepared. Resin compositions for Test Nos. 2 to 30 were each prepared in the same manner as in the foregoing.

Next, each of those resin compositions was filled into a molding die so as to have a thickness of 8 mm after its curing. Then, the molding die was placed in a heating furnace and heated at 120° C. for about 3 hours so that the resin composition might be subjected to heat curing. The resultant cured product (molded article) was cut into a size measuring 150 mm by 15 mm. Thus, test pieces according to Test Nos. 1 to 30 were obtained.

The test pieces for Test Nos. 1 to 30 obtained in the foregoing were each subjected to a three-point bending test with a strength testing machine (AUTOGRAPH AG-5000D manufactured by Shimadzu Corporation) at a testing speed of 2.5 mm/min so that a three-point bending strength, an elastic modulus, and a strain might be measured. Tables 2 and 3 show the results.

Figure 2:
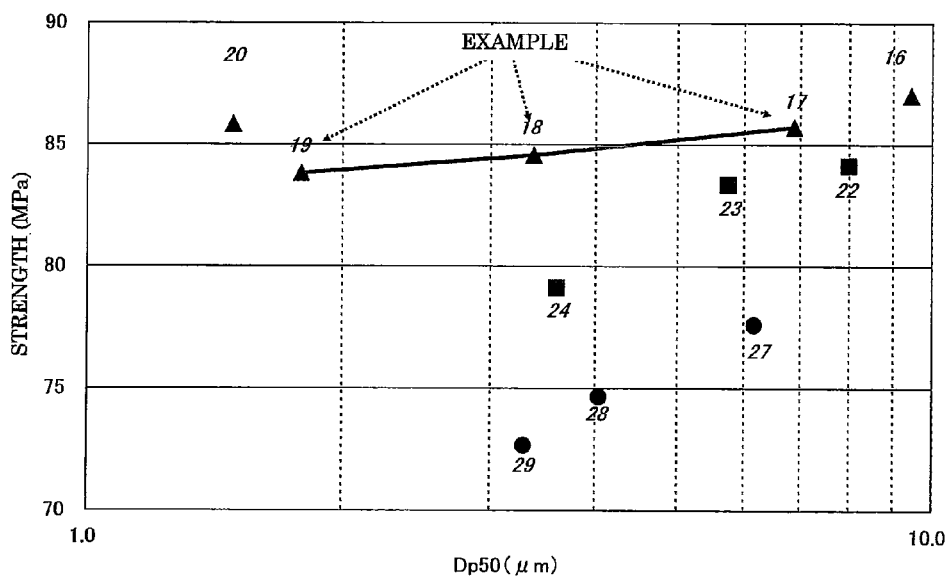
FIG. 2 is a graph showing the results of three-point bending strengths in strength tests for molded articles.

With regard to those results, first, FIG. 2 illustrates a graph obtained from a relationship between the three-point bending strength of a molded article obtained from a mixed powder formed of two powders each subjected to a silane coupling treatment and the average secondary particle diameter of the mixed powder. As is apparent from FIG. 2, molded articles each formed of a mixed powder obtained by mixing powders corresponding to the aluminum hydroxide powders X and Y in the present invention were each confirmed to have a higher bending strength than that of a molded article obtained from any other mixed powder. In particular, any such molded article had a higher bending strength than that of a molded article obtained from any other mixed powder having an average secondary particle diameter equal or close to that of such mixed powder. This is probably because a force to be applied upon bending is dispersed in an additionally uniform fashion as a result of the specification of the shape coefficients of the powders X and Y.

Figure 3:
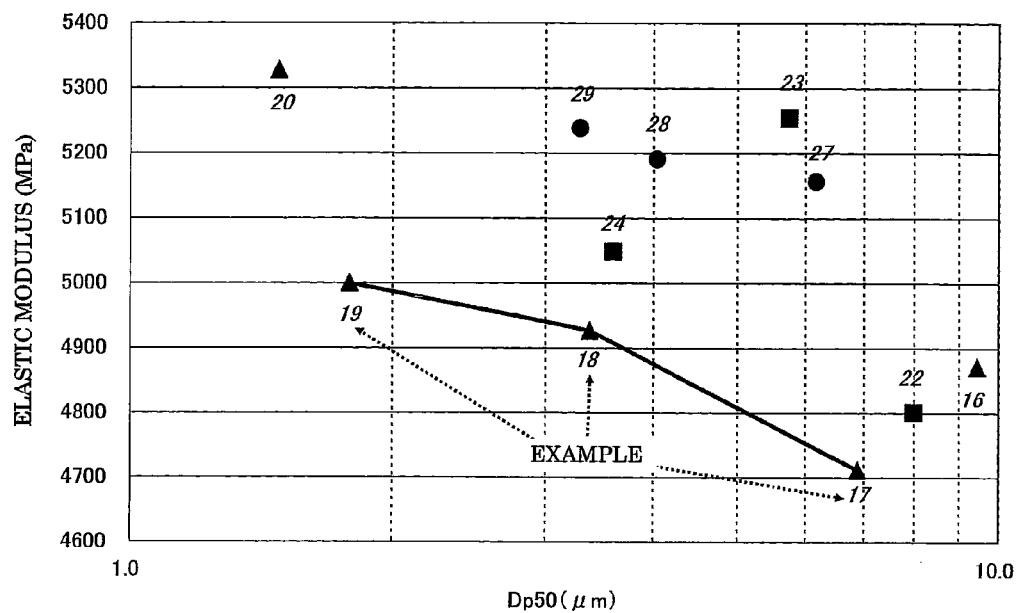
FIG. 3 is a graph showing the results of elastic moduli in the strength tests for the molded articles.
Figure 4:
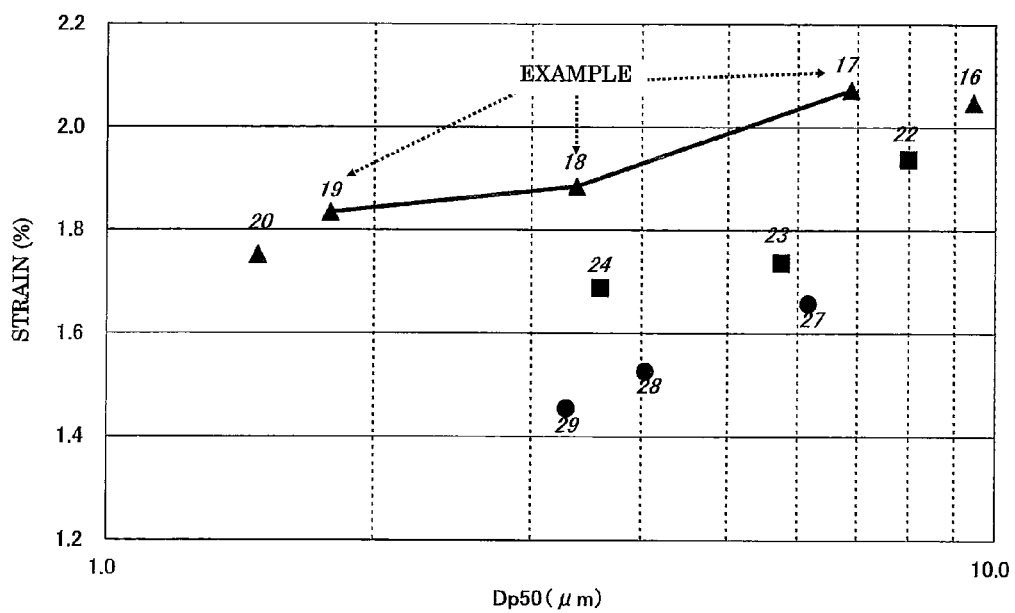
FIG. 4 is a graph showing the results of strains in the strength tests for the molded articles.

In addition, similarly, FIG. 3 illustrates a graph obtained from a relationship between the elastic modulus of a molded article obtained from a mixed powder formed of two powders and the average secondary particle diameter of the mixed powder, and FIG. 4 illustrates a graph obtained from a relationship between the strain of a molded article obtained from a mixed powder formed of two powders and the average secondary particle diameter of the mixed powder. As is apparent from those graphs, a molded article formed of the mixed powder according to the present invention was confirmed to have a lower elastic modulus and a larger strain than those of a molded article obtained from any other mixed powder. That is, the following assumption can be made. As a result of the specification of the shape coefficients of the powders X and Y, the molded article has good elasticity and easily deforms by virtue of, for example, the slippage of each particle in the molded article. In consideration of the foregoing together with the results of the above-mentioned bending strength tests, the molded article obtained from the mixed powder according to the present invention can be evaluated as being hard to rupture because the molded article has elasticity and easily deforms.

As can be seen from the foregoing results, the amount in which the mixed aluminum hydroxide powder according to the present invention is filled into a resin or the like can be increased, and the mixed powder enables the production of a molded article having excellent strength properties.

INDUSTRIAL APPLICABILITY

The mixed aluminum hydroxide powder of the present invention is suitable for various fillers to be filled into resins and the like. For example, the mixed powder can be utilized as any one of various fillers including: a flame retardant filler upon formation of a printed board, a semiconductor sealing material, any other electrical member, or the like; a filler for an artificial marble upon formation of a kitchen counter, a bathtub, a wash stand, or the like; a thermally conductive sheet for discharging heat from, for example, a glass substrate of which a flat panel display such as a PDP is formed; a thermally conductive sheet for an IC chip; and a thermally conductive filler upon formation of, for example, a sealing material for an electrical part. The mixed powder can be suitably utilized in an application where the filler is desired to be filled in a large amount like a flame retardant filler, a thermally conductive filler, a filler for an artificial marble, or the like out of those fillers.

The invention claimed is:

1. A mixed aluminum hydroxide powder for use in a flame retardant filler or thermally conductive filler upon formation of an electrical member, wherein:

the mixed aluminum hydroxide powder is obtained by mixing an aluminum hydroxide powder X having an average secondary particle diameter (Dp) measured by a laser diffraction method in a range of 5 to 16 µm and a shape coefficient ($\phi$) of 4 or less, and an aluminum hydroxide powder Y having an average secondary particle diameter (Dp) measured by the laser diffraction method in a range of 0.5 to 2.0 µm and a shape coefficient ($\phi$) of 4 or less so that a weight ratio "X/Y" becomes 8/2 to 4/6, and the mixed aluminum hydroxide powder has an average secondary particle diameter (Dp) in a range of 1.6 to 5.9 µm; and a bending strength and an elastic modulus determined by a three-point bending test of a cured product for a test measuring 150 mm long by 15 mm wide by 8 mm thick obtained by blending the mixed aluminum hydroxide powder at a ratio of 54 wt % with respect to an acrylic resin syrup and subjecting the resultant to heat curing are as described below:

bending strength: 80.0 MPa or more
elastic modulus: 5152 MPa or less.

2. A mixed aluminum hydroxide powder according to claim 1, wherein a content of particles each having a particle diameter of 37 µm or more is 20 wt % or less.

3. A mixed aluminum hydroxide powder according to claim 1 or 2, wherein a surface of each of the aluminum hydroxide powder X and the aluminum hydroxide powder Y is treated with a silane coupling agent.

4. A mixed aluminum hydroxide powder according to claim 1, wherein the aluminum hydroxide powder X and the aluminum hydroxide powder Y are each precipitated from a sodium aluminate solution obtained by a Bayer process.

5. A molded article obtained by filling the mixed aluminum hydroxide powder according to claim 1 into a resin.

* * * * *